(No Model.)

W. S. JAMES.
STEAM COOKING STOVE.

No. 472,730. Patented Apr. 12, 1892.

Witnesses
Geo. E. Frech.
N. T. Collamer.

Inventor
Will. S. James
By his Attorneys,
C. A. Snow & Co.

UNITED STATES PATENT OFFICE.

WILL S. JAMES, OF ABILENE, TEXAS.

STEAM COOKING-STOVE.

SPECIFICATION forming part of Letters Patent No. 472,730, dated April 12, 1892.

Application filed February 10, 1891. Serial No. 380,940. (No model.)

*To all whom it may concern:*

Be it known that I, WILL S. JAMES, a citizen of the United States, residing at Abilene, in the county of Taylor and State of Texas, have invented a new and useful Steam Cooking-Stove, of which the following is a specification.

This invention relates to stoves, and more especially to that class wherein food is to be steamed.

The object of the invention is to provide a stove which is preferably portable, so that it can be used on a gas-stove base, a lamp-stove, an ordinary cooking-stove, or even over a camp-fire, and which when so used will provide an apartment for baking or warming and another apartment for steaming, the steam being generated within a surrounding boiler and by the heat that has been used to heat the oven.

To this end the invention consists of the details of construction hereinafter more fully described and claimed, and as illustrated on the sheet of drawings, wherein—

Figure 1:
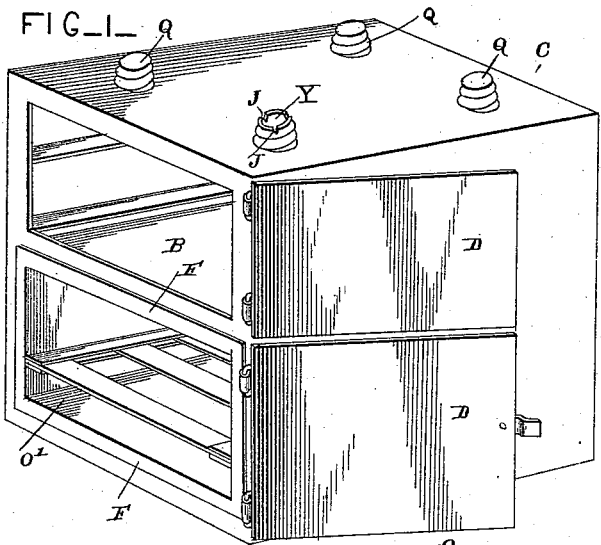
Figure 5:
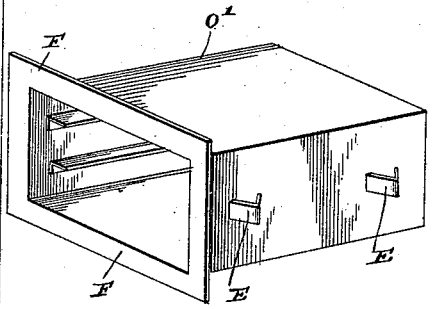
Figure 2:
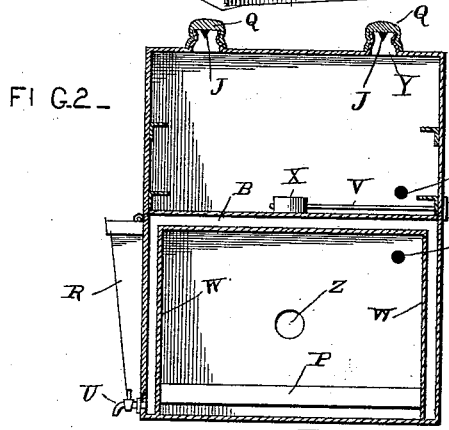
Figure 3:
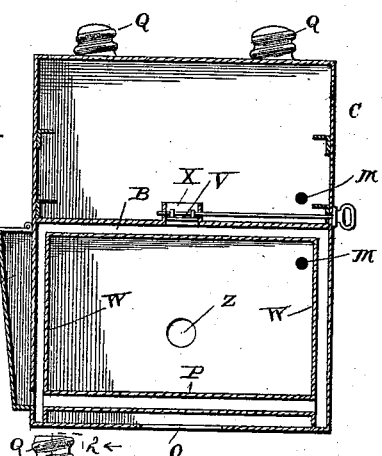
Figure 4:
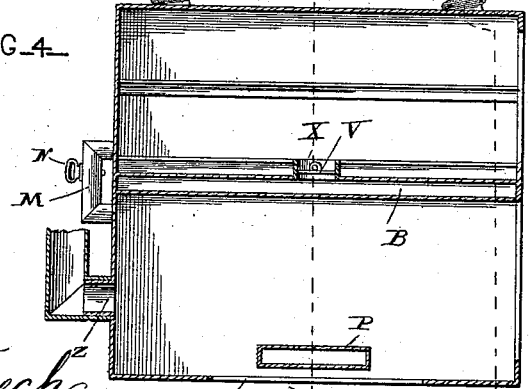

Figure 1 is a perspective view of this device complete, showing the doors open. Figs. 2 and 3 are cross-sections on the lines 2 2 and 3 3; and Fig. 4 is a longitudinal section through the center of the device, the oven in all these figures being removed. Fig. 5 is a perspective detail of the oven removed.

Referring to the said drawings, the letter C designates a casing having a large hole O in the bottom, whereby heat is admitted thereto from the source of heat, whatever it may be. This casing is divided horizontally and about centrally by the devices hereinafter described, and both sections are closed by doors D, of any suitable construction, as shown. In the lower section is removably inserted an oven O', of rectangular shape and with closed rear and open front, the sides of the oven around this front being turned outwardly to form a flange F. In transverse section the oven is smaller in all directions than the section within which it is located, and ears or projections E are secured to the oven upon its exterior and hold it properly spaced from all sides of the casing.

The letters W W designate the inner walls of the casing throughout the lower section, which walls are connected with the casing proper, and thereby form a chamber at each side of the device. These chambers are connected by a transverse pipe P at a point just above the bottom of the casing over the hole O therein, but beneath the oven O' when in place. Although I have not shown it, it will be understood that this transverse pipe might be a series of coils or convolutions instead of a simple straight pipe, as illustrated, without departing from the spirit of my invention.

The letter B designates the body portion of a boiler, which forms the partition between the two sections of the casing and communicates at its edges with the chambers forming other portions of the boiler and standing at the sides thereof.

The letter R designates a receptacle secured to one side of the casing, communicating with one of the side chambers, and the letter U designates a faucet, preferably arranged where shown. By this means water can be poured into the receptacle R, and will flow thence into the two chambers and their connecting-pipe, and to prevent the water overflowing the receptacle it may be drawn off through the faucet U. The device being then placed upon a stove or other source of heat, the water within the chambers and pipe is converted into steam, which rises into the body portion B and is allowed to escape through an opening X, regulated by a valve V, whose handle extends to the exterior of the casing, and by this means whatever articles are placed within the upper section of the casing will be thoroughly steamed.

The letter Z designates an opening for the exit of the products of combustion, and this may be connected with a chimney, if desired. The heat passing through the hole O first strikes the pipe P and heats the water therein, then passes around all sides of the oven O' and bakes whatever may be located therein, and finally passes out the exit Z.

The letter M designates a communicating pipe, which connects the two sections of the casing around the rear end of the body portion B, and this pipe is provided with a valve N. After the steaming has taken place within the upper section and the valve is closed the valve N is turned so as to allow a portion of the heat within the lower section to pass into the upper section, whereby the latter is dried. In this manner the upper section of the casing is prevented from becoming rusted.

In any case the steam or the heat within the upper section must have some exit, and I preferably provide a number of raised threaded collars Y in the top of the casing, which are adapted to be closed by screw-caps Q, one of which is shown as removed in Fig. 1. By removing all these caps it will be obvious that a dish—such as a coffee-pot—may be rested thereon in order to cook the contents, and in order to avoid the upper end of the openings being closed by the bottom of the dish I provide them with a number of notches or serrations J, so that the steam or products of combustion may escape and strike directly against the bottom of the vessel.

It will be seen that I utilize the heat which serves to heat the oven for converting the water into steam, and I thereby attain better results and secure more service from the same amount of fuel than results from use of devices of similar nature heretofore constructed, as far as I am aware.

This improved oven and steamer is especially usefully useful upon oil or gas stoves or when camping out, although I desire to be in no manner limited by the precise construction shown and described to uses of which the device is susceptible.

What is claimed as new is—

1. In a stove, the combination, with a casing divided vertically by a transverse boiler-body, chambers in the sides of the lower half of the casing, communicating with said body, and a transverse pipe connecting the lower ends of said chambers across the bottom of the casing, of a heat-inlet opening in the bottom of the casing below said pipe, an exit-opening in the rear of the casing, and an oven within the casing between said chambers, as and for the purpose set forth.

2. In a stove, the combination, with a casing having an oven in its lower section, a water-boiler surrounding the oven, and a heat-inlet opening in the bottom and a heat-outlet opening in the rear of said casing, of a steaming-chamber in the upper section of said casing, an opening in the boiler, controlled by a valve extending to the exterior of the casing, and steam-outlet openings in the top of the casing, as and for the purpose set forth.

3. In a stove, the combination, with a casing having an oven in its lower section, a water-boiler surrounding the oven, a heat-inlet opening in the bottom and a heat-outlet opening in the rear of said casing, a steaming-chamber in the upper section of the casing, an opening from the boiler-body to said upper section for admitting steam thereto, and steam-outlet openings in the top of the casing, of a communicating pipe connecting the two sections of the casing through the side walls thereof and a valve in said pipe, as and for the purpose set forth.

4. In a stove, the combination, with a casing having chambers in its side walls, a transverse pipe P, connecting said chambers above a heat-inlet opening H in the bottom of the casing, a boiler-body B, connecting the upper ends of said chambers, and an oven surrounded by such water-space, of a receptacle R upon the exterior of the casing, communicating with one of said chambers, but terminating at a point level with the bottom of the boiler-body, a faucet U in the lower end of one of said chambers, and a valved opening X in the top of the boiler-body, as and for the purpose set forth.

5. In a stove, the combination, with a casing having a steaming-chamber in its upper section, an oven in its lower section, and a water-space surrounding said oven and communicating by a valved opening with said steaming-chamber, of raised threaded collars Y in the top of the casing, having notches J in their upper ends and screw-caps Q removably mounted thereon, as and for the purpose hereinbefore set forth.

In testimony that I claim the foregoing as my own I have hereto affixed my signature in presence of two witnesses.

WILL S. JAMES.

Witnesses:
JOHN G. GIBBONS,
NELIA STICTHAM.